Sept. 4, 1962 D. H. DE MOTT 3,052,127
SENSING APPARATUS
Filed Jan. 7, 1959 2 Sheets-Sheet 1
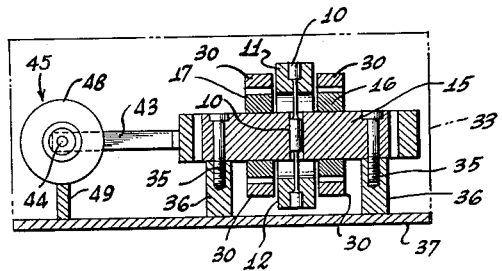
Fig.1
Fig.2
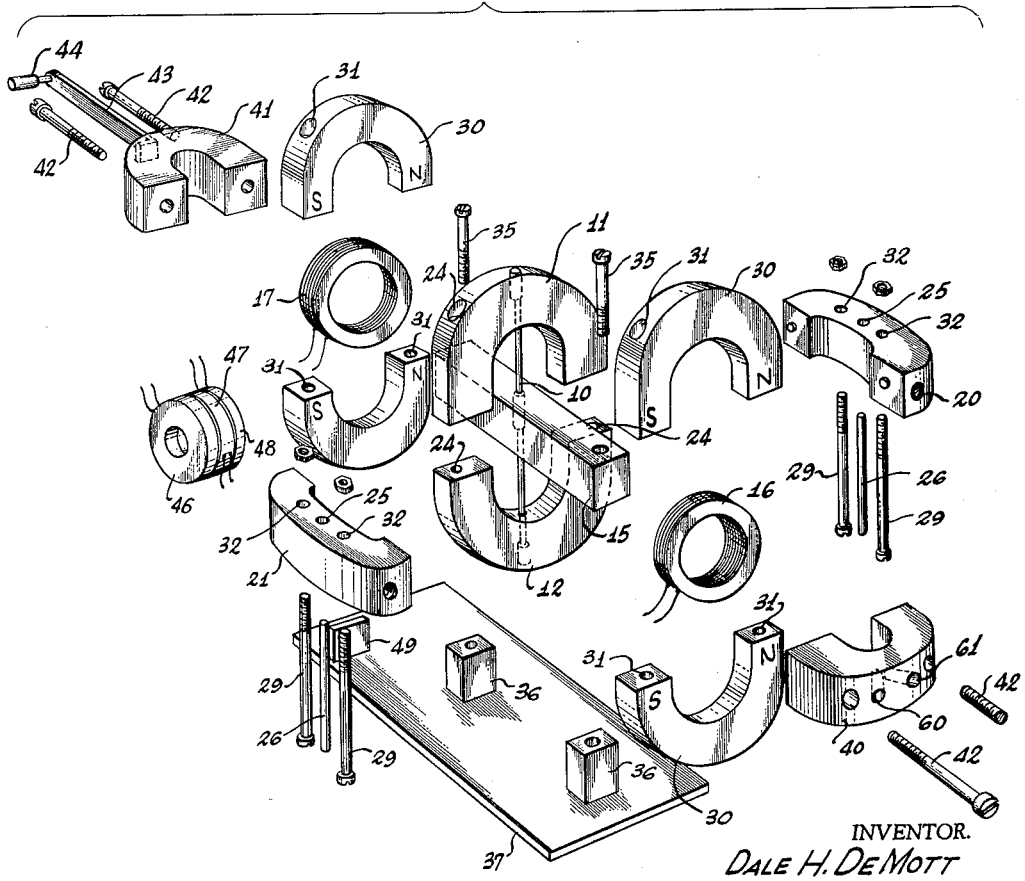
INVENTOR.
DALE H. DE MOTT
BY Fulwider Mattingly & Huntley
Attorneys Sept. 4, 1962 D. H. DE MOTT 3,052,127
SENSING APPARATUS
Filed Jan. 7, 1959 2 Sheets-Sheet 2
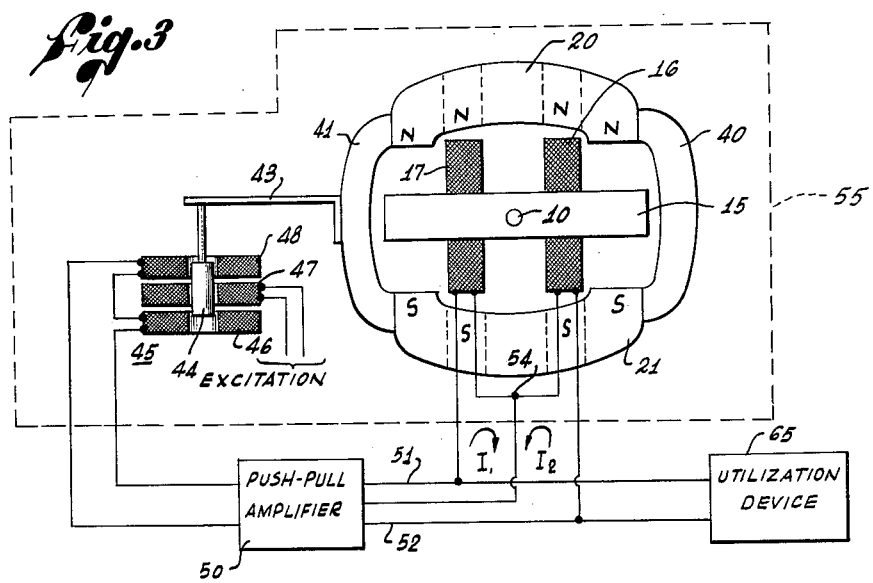
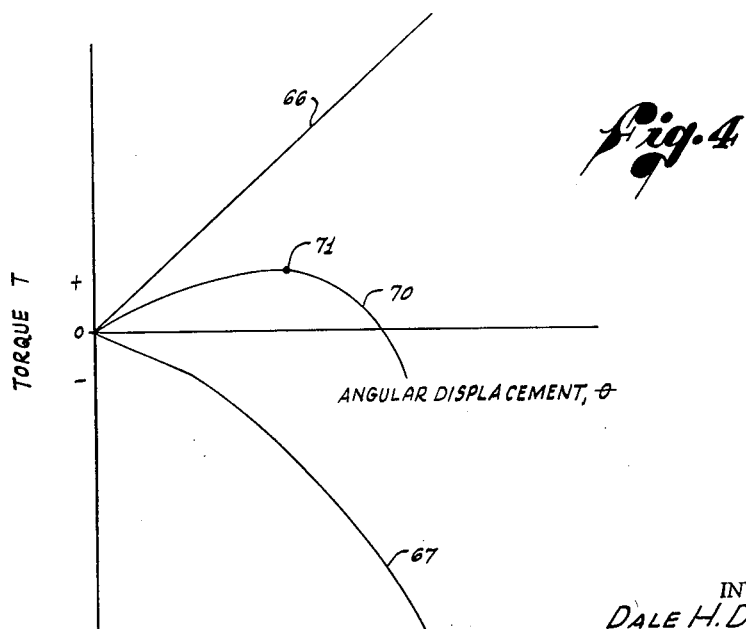
INVENTOR.
DALE H. DeMOTT
BY Fulwider Mattingly & Huntley
Attorneys

United States Patent Office 3,052,127
Patented Sept. 4, 1962

3,052,127
SENSING APPARATUS
Dale H. De Mott, La Habra Heights, Calif., assignor to Air Logistics Corp., Pasadena, Calif., a corporation of California
Filed Jan. 7, 1959, Ser. No. 785,498
8 Claims. (Cl. 73—517)

This invention relates to devices for detecting the movement of a body relative to a reference, and more particularly to a unique electromechanical device and suspension system therefor, for use as an inertial reference apparatus.

The term "inertial reference apparatus" is used herein to denote any device or system which provides indications of the position of a body (e.g., an aircraft) with respect to a reference (e.g., an axis in space), and wherein such indications may be used to control the movement of the body. Such devices or systems may include angular accelerometers, compasses, gyroscopes, and gimbal systems. However, it will be seen that my unique suspension system is suitable for use in other types of mechanical and electromechanical systems, e.g., meter movements.

In many devices and systems employing movable mechanical elements, the operation of such elements, and data obtained therefrom, is not as accurate as desired. This is due largely to the manner in which the mechanical elements are supported. For example, in angular accelerometers heretofore employed, a mass is either supported on bearings or on a torsion bar fixed at its ends to a housing secured in an aircraft. Whatever form these accelerometers take, they are uniformly characterized by a level of sensitivity below which they fail to indicate angular accelerations of a body. Although it is highly desirable to measure angular accelerations below the threshold of prior art accelerometers, methods of construction heretofore used make it impossible to increase their sensitivity.

The requirements for a good accelerometer are that the mass be as large as possible, and that such mass and its suspension system have no friction. Since, for any given accelerometer, the torque on the mass is equal to the products of the mass and the acceleration, it is readily seen that, the larger the mass, the smaller the acceleration needed to produce a given torque.

Another reason for increasing the mass in those systems which employ bearings is to overcome bearing friction. However, the larger mass requires larger bearings. To offset the effects of vibrations on the mass, the larger bearings are usually pre-loaded, and hence have a larger friction level. The effect of such increased friction level is, of course, to restrain movement of the larger mass. In the final analysis, the only way to overcome the problems of accelerometers using bearing suspension systems is to make better and better bearings; however, and as is well known, a bearing suspension system will always provide undesired friction.

In angular accelerometers which have heretofore employed torsion bars, such bars are made quite stiff so as to offset vibration effects. However, a concomitant of a stiff torsion bar is that it has tremendously high spring restraint. Such spring restraint decreases displacement of a mass fixed thereto, and therefore decreases the sensitivity of the device.

It is an object of this invention to provide a unique suspension system for inertial reference apparatus which renders it insensitive to lateral accelerations and vibration effects.

It is another object of this invention to provide an inertial reference device for use as an angular accelerometer in which spring restraint of a mass can be adjusted magnetically to sense smaller accelerations than have heretofore been possible with prior art accelerometers.

A further object of this invention is to provide a torsion bar type of accelerometer employing magnetic fields to offset the spring restraint of the torsion bar.

A still further object of this invention is to provide a unique suspension system for supporting one body relative to another body in such a manner that there is minimum mechanical coupling between them.

It is yet another object of this invention to provide a unique device and system employing a torsion bar and a relatively large mass mechanically interconnected with a moving body, and utilizing magnetic means for minimizing the effects of spring restraint of the torsion bar.

It is also an object of this invention to provide a unique compass device and system utilizing a mechanically resilient element, wherein the spring restraint of the element is counteracted by a magnetic field for permitting the interaction between such field and the earth's magnetic field to reflect the true position of the element relative to the earth's magnetic field.

The above and other objects and advantages of this invention will become apparent from the following description, taken in conjunction with the accompanying drawings of a preferred embodiment thereof, in which:

FIGURE 1 is a side elevation view in section of my angular accelerometer device, showing an armature secured to a fixed support and extending through a pair of coils surrounded by permanent magnets, and having a torsion bar secured to the armature and attached to a mass which includes the magnets;

FIGURE 2 is an exploded view of the parts of the accelerometer of FIGURE 1, showing their interrelationship to affect movement of the mass with respect to the armature;

FIGURE 3 is a schematic diagram of my system employing the accelerometer for developing an output signal in the presence of angular accelerations, and for utilizing such output signal to control a utilization device; and FIGURE 4 is a graph of torque plotted against angular displacement, showing the individual and composite effects of the mechanical and magnetic portions of the device for use in explaining the use of my device as an accelerometer.

The following describes my invention in connection with an angular accelerometer and a compass, as specific examples thereof. However, it will become apparent that my invention provides a unique frictionless suspension system for supporting a body having spring restraint relative to another body and which combines therewith unique means for adjusting the spring restraint.

Referring to FIGURES 1 and 2, an angular accelerometer in accordance with this invention comprises a torsion bar 10 which at its ends is fixed in the centers of two end bells 11, 12. The end bells 11, 12 are opposed, substantially U-shaped members, and the ends of the torsion bar 10 extend through the centers of the end bells.

Intermediate its ends, the torsion bar extends through the center of an elongated armature element 15, and the torsion bar 10 and armature 15 are secured together. The normal position of the armature 15 is, as shown best in FIGURE 2, such that its longitudinal axis is at right angles to a plane through the centers of the legs of the end bells 11, 12.

A pair of coils 16, 17 are mounted on the armature 15 and pole pieces 20, 21, shown as U-shaped members, are disposed on opposite sides of the armature 15. As shown, the pole pieces 20, 21 are disposed between the adjacent legs of the end bells 11, 12, and are parallel to the armature 15.

The pole pieces 20, 21 are secured to the end bells 11, 12, and for this purpose aligned openings 24 extending through the legs of the end bells 11, 12, and openings 25 in the pole pieces 20, 21 are adapted to receive bolts 26 which extend through the legs of one end bell 11 and the pole pieces 20, 21 into the legs of the end bell 12. The bolts 26 are used to aid in holding the pole pieces 20, 21 and the end bells together.

My invention employs four permanent magnets 30 which are arranged so that their north poles all engage one of the pole pieces 20, and their south poles engage the other pole piece 21. To this end, the magnets 30, which are shown as U-shaped members, are disposed on opposite sides of the end bells 11, 12, and each has its legs in contact with both pole pieces 20, 21. The magnets are of sufficient size that they do not touch the coils.

The magnets 30 are suitably secured to the pole pieces 20, 21. To aid in securing the magnets and pole pieces together, the magnets and pole pieces are provided with aligned openings 31, 32. The magnets and pole pieces are locked together by nut and bolt arrangements 29 which extend through the openings 31, 32 for engaging the remote surfaces of the magnets 30 and securing them in place.

The above described assembly is mounted in a housing 33, as by screw bolts 35 extending through the armature 15 and into boss projections 36 extending from a base 37 of the housing 33. Thus arranged, the armature 15 is rigidly fixed in position; however, the mass which is affixed to the torsion bar 10 (including the end bells 11, 12, the pole pieces 20, 21, and the magnets 30) is suspended within the housing.

Secured to the ends of the pole pieces 20, 21, are a pair of counterweights 40, 41. As shown, the counterweights 40, 41 are U-shaped members, the legs of which are secured to the ends of the respective pole pieces 20, 21. The legs of the counterweights are sufficiently spaced so that the mass attached to the torsion bar 10 can undergo an angular movement with respect to the armature 15 without engaging the counterweights. The counterweights 40, 41 are secured to the ends of the pole pieces 20, 21, as by threaded bolts 42. Rigidly affixed to one of the counterweights 41 is an L-shaped bracket member 43 which supports at its outer end a magnetic plug element 44 for an electromagnetic pickoff device 45.

For the purpose of my invention, I prefer to employ an electromagnetic pickoff device of the type known as a linear variable differential transformer. Such a device employs three spaced coils 46, 47, 48 (see FIGURE 3) which are supported on (see FIGURE 1) the base 37, as on a boss projection 49. An excitation voltage is applied to the terminals of the middle coil 47. The outer coils 46, 48, are connected in series, as shown, so that a voltage will appear in the output of the pickoff 45 which corresponds, in magnitude and phase, to the distance and direction the plug 44 is moved relative to a center position between the outer coils 46, 48.

In utilizing my device as an angular accelerometer, I employ it in a typical system (see FIGURE 3) in which I connect the output of my pickoff 45 to an amplifier 50. The output of the amplifier 50 is connected, as at 51 and 52, to respective ends of the coils 16, 17, and the remaining ends of the coils are directly connected as at 54. As will be seen from the combination of the pickoff device 45 and the amplifier 50, any output voltage from the pickoff 45 will result in currents $I_1$, $I_2$ from the amplifier 50 flowing through the coils 16, 17 in opposite directions. The directions of the currents $I_1$, $I_2$ in any case will depend upon the relative displacement of the plug 44 from its center position, and the currents will also differ in magnitude.

It will be seen from FIGURE 3 that the use of the magnets 30 as above described results in making the pole piece 20 a north pole, and the pole piece 21 a south pole. Thus, the armature 15 is disposed in a magnetic field such that an angular displacement of the mass, i.e., about the axis of the torsion bar 10, immediately places one end of the armature 15 nearer to a north pole and the other end nearer to a south pole. It will be seen that this sets up attractive forces between the pole pieces 20, 21 and the armature 15 which have the effect of accentuating the displacement. This means that the mechanical spring rate of the torsion bar 10 is counterbalanced by a magnetic anti-centering circuit, whereby despite the high torsional spring rate of the torsion bar 10, the spring rate of the entire unit is made substantially negligible. Thus, angular acceleration of the housing 33 results in a movement of the mass attached to the torsion bar 10, and hence movement of the plug 44 of the pickoff 45.

In order to make any accelerometer insensitive to local magnet fields and the earth's magnetic field, the housing 33 forms an effective magnetic shield, as indicated at 55 in FIGURE 3. For this purpose, the housing 33 may be made of any suitable material, e.g., mu-metal.

To aid in making my device insensitive to vibrations and lateral accelerations, I make my torsion bar of a very stiff rod which is extremely rigid in the transverse and axial directions and will retain such rigidity. Additionally, the unit is statically balanced so that its center of gravity is precisely on the axis of the torsion bar. To this end, and referring to FIGURE 2, I provide adjusting screws 60, 61 in one of the counterweights 40. These screws 60, 61 are turned into the counterweight body as necessary to compensate for the weights of the bracket 43 and plug 42, and any unbalances in the weights of the remaining parts.

In order to statically balance the unit, I subject it to lateral oscillatory movement and adjust the screws 60, 61 until there is no output obtained from the pickoff 45 at the frequency of the lateral oscillations.

With the center of gravity of the unit on the axis of the torsion bar 10, my magnetic circuit, as above explained, insures that relative movement between the plug 44 and the coils 46, 47, 48 causes a change in output current ($I_1 - I_2$) which accurately reflects the angular acceleration of the body (e.g. aircraft or missile) in which the housing is secured.

In the circuit above described in connection with FIGURE 3, it will be seen that any output from the pickoff device 45 due to a change in angular acceleration is reflected as a change in current in one of the coils 16, 17 which is greater in magnitude than that in the other of the two coils. The direction of the greater current is such as to establish a magnetic field which opposes the magnetic field attracting the armature 15 and the pole pieces 20, 21 and to cause the mass attached to the torsion bar 10 to assume its initial position. At such position, the output of the pickoff is again zero.

If the acceleration is constant, the differential current in the output of the amplifier 50 will remain constant. If it is desired to utilize such output to reduce the angular acceleration to zero, this may be done automatically by applying the outputs at 51 and 52 to a utilization device 65, which for example may be an automatic pilot for an aircraft, which functions in response to the differential current to decelerate the body or aircraft, and hence the housing 33 until the differential current is reduced to zero.

Thus, it will be seen that my system provides an accelerometer having essentially three "springs." One of the springs is the torque bar 10, together with the mass coupled thereto. A second is a magnetic spring provided by the magnets 30 and the pole pieces 20, 21 as above explained. The third spring is the electrical spring, provided by the coils 16, 17 in the feedback system above described.

It will be appreciated that without the coils 16, 17 and the feedback loop, the above described apparatus will provide an effective accelerometer. By virtue of the magnetic anti-centering force estalished by the permanent magnets 30 and the pole pieces 20, 21, the output of the pickoff 45 accurately reflects the angular acceleration of the housing 33. Accordingly, my invention embraces an angular accelerometer employing such a magnetic anti-centering spring. However, the use of the feed back circuit or electrical spring aids in automatically restoring the armature 15 and the mass attached to the torque bar to their initial positions, so that angular accelerations are always measured from the same reference position.

The operating characteristics of my accelerometer can be determined from plots of torque, T, versus anglar displacement, $\theta$ (see FIGURE 4), drawn for separate conditions where the torsion bar 10 is turned without the application of the magnetic spring, and where torque is exerted thereon by the magnetic spring alone. As shown in FIGURE 4, angular displacement of the torsion bar 10 results in a straight line spring restraint characteristic, as shown by the curve 66. This means, of course, that the mechanical spring rate (or spring restraint) of the torsion bar 10 and the mass attached thereto increases at a constant slope with increases in angular displacement.

As above explained, my magnet circuit offsets the mechanical spring restrain. Thus, the curve 67 of T vs. $\theta$ for such circuit is opposite in sign to curve 66. The particular shape of the curve 67 depends upon several factors, including the size of the element in the magnetic circuit, the spacing of the elements, the length and volume of the air gaps involved and the strength of the magnets. Addition of the curves 66, 67, results in a composite curve 70 which initially has a positive slope, reaches a peak 71 where its slope is zero, and then decreases as shown.

The curve 70 thus represents the spring restraint of the unit as a whole, i.e., the combined effects of the linear spring restraint and the magnetic anti-centering force.

Although the point 71 is that at which my accelerometer is at its most sensitive, I have found that with an accelerometer incorporating my invention, in which the spring rate is at a point other than at point 71, much smaller angular accelerations are sensed than is possible with the prior art accelerometers. For example, accelerometers built in accordance with my invention have been capable of sensing angular accelerations of considerably less than 0.1 radian/sec.$^2$, an achievement which cannot be attributed to prior art accelerometers.

In order to select the point 71 with my invention, the unit is adjusted so that the torsion bar 10 and its associated mass are in a position where the pole pieces 20, 21 are at an angle with respect to the armature 15. In such position, the pickoff 45 is set for zero output.

It will be noted that my unit has no problems of bearing friction or spring restraint to prevent it from having maximum effectiveness. Having no such problems, I can increase the mass attached to the torsion bar as desired, and the sensitivity of the unit will increase accordingly.

As previously mentioned, the angular accelerometer form of my invention is enclosed in a magnetic shield. However, I remove the shielding, i.e., make the housing a non-shielding type, to provide a compass.

To understand how my invention can operate as a compass, it should be noted that, without a magnetic shield surrounding the parts, the magnetic field established with the magnets 30 will interact with the earth's magnetic field. Thus, the earth's magnetic field causes a torque to be exerted on the torsion bar and its associated mass, and such torque is proportional to the heading of the craft (aircraft or ship) in which the device is placed. Thus, the torque is constant for a fixed heading. Accordingly, there is an output voltage from the amplifier which corresponds to the heading of the craft. The utilization device 65 is adapted to respond to such voltage to indicate or control the heading of the craft.

In order that my invention operate as a reliable compass system or heading indicator, I nullify the effects of stray magnetic fields in the vicinity thereof. To this end, I place the device on the craft in a location where the stary field or fields are substantially constant. Then I prevent such constant fields from exerting a torque on the mass, as by shielding, or by adjusting its position relative to the armature (as previously described) so that there is zero output due to the strays.

It will be apparent that my system is not limited to the particular amplifier arrangement shown. If desired, an amplifier arrangement having a single-ended input and a single ended or double-ended output may be used to provide the desired output voltage representing heading or angular acceleration. Also, the amplifier may be included in the housing, so as to provide a compact inertial reference apparatus.

From the foregoing, it will be apparent that I provide a unique inertial reference device. Further, my invention also includes a unique suspension system having a multitude of uses in other mechanical systmes, e.g., gyroscopes, gimbal systems, meter movements. This suspension system is frictionless, and provides for variable mechanical coupling between two bodies, and it can be adjusted so that the spring restraint between the two bodies is positive, zero, or negative. Therefore, while I have illustrated and described a particular embodiment of my invention, it will be recognized that the spirit and scope thereof embrace many modifications. Accordingly, I do not intend that my invention be limited, except as defined by the appended claims.

I claim:

1. Sensing apparatus comprising: a frame; a bar of magnetic material fixed at its ends to said frame; a stiff torsion rod extending perpendicular to said bar, said rod extending through the center of said bar and being secured thereto, the ends of said rod being equally spaced from said bar and in non-touching relation with said frame, said rod being rigid in the transverse and axial directions, said rod having a high torsional spring rate; a mass extending between and secured to the ends of said rod, said mass including a pair of opposed, generally U-shaped elements secured to the ends of said rod and having their legs on opposite sides of said bar, the center lines of said legs and the axis of said rod lying in a plane perpendicular to the axis of said bar; respective elongated pole pieces of equal length centrally located between and secured to the opposed legs of said U-shaped elements, said pole pieces having opposed end portions equally spaced from said bar; two pairs of opposed substantially U-shaped permanent magnets parallel to said U-shaped elements, the magnets of each pair extending between said end portions of said pole pieces and being secured thereto, each of the magnets having a north pole engaging one pole piece and a south pole engaging the other pole piece, so that both end portions of said one pole piece are north poles and both end portions of said other pole piece are south poles.

2. Sensing apparatus as defined in claim 1, further including: a pair of inductive elements surrounding said bar and supported thereon on opposite sides of said U-shaped elements; a transformer device having an excitation coil midway between a pair of output coils on a common axis; a magnetic plug element on said common axis normally centrally located with respect to said excitation coil, said plug element being fixed to said mass; means to supply an excitation voltage to said excitation coil; a push-pull amplifier coupled between said inductive elements and said output coils; and means coupled to said amplifier to utilize the output thereof.

3. Sensing apparatus comprising: a frame; a bar of magnetic material fixed at its ends to said frame; a stiff torsion rod extending perpendicular to said bar, said rod extending through said bar and being secured thereto, the ends of said rod being equally spaced from said bar and in non-touching relation with said frame, said rod being rigid in the transverse and axial directions, said rod having a high torsional spring rate; a mass extending between and secured to the ends of said rod, said mass being symmetrically disposed with respect to said bar, said mass including elongated elements of magnetic material on opposite sides of said bar having end portions equally spaced from said bar; means to magnetize said elements of magnetic material so they are oppositely poled; and means coupled to said frame and said mass to detect any angular movement of said frame about the axis of said rod.

4. Sensing apparatus comprising: a frame; a bar of magnetic material fixed at its ends to said frame; a stiff torsion rod extending perpendicular to said bar, said rod extending through said bar and being secured thereto, the ends of said rod being equally spaced from said bar and in non-touching relation with said frame, said rod being rigid in the transverse and axial directions, said rod having a high torsional spring rate; two pairs of magnetic elements on opposite sides of said bar, the elements of each pair being equally spaced from the center of said bar, the spaces between said elements and said bar being equal, the elements of the pair on each side of the bar having the same polarity, the polarity of the elements of the pair on one side of the bar being opposite to that of the elements of the pair on the opposite side of the bar; a mass symmetrical with respect to said bar and secured to the ends of said rod; and means supporting said mass and two pairs of elements in fixed spaced relation.

5. Sensing apparatus comprising: a frame; a bar of magnetic material fixed at its ends to said frame; a mass symmetrical about said bar and in non-touching relation therewith including means providing spaced pairs of magnetic poles of opposite polarity that are equidistant from the center of said bar and on opposite sides thereof, said poles normally being the same distance from said bar, the poles on the respective sides of said bar being of the same polarity; means suspending said mass along an axis perpendicular to the axis of said bar to permit angular acceleration of said frame about the axis of said mass to cause said bar to be displaced in a direction tending to move the bar closer to respective poles in said pairs that are of opposed polarity, whereby to establish a magnetic path between said respective poles through said bar; and means continuously responsive to the displacement of said bar to develop electric signal indications corresponding to the extent of said displacement.

6. Sensing apparatus as defined in claim 5, wherein said mass comprises a stiff torsion rod extending perpendicular to said bar, said rod extending through said bar and being secured thereto, the ends of said rod being equally spaced from said bar and in non-touching relation with said frame, said rod being rigid in the transverse and axial directions, said rod having a high torsional spring rate; a mass extending between and secured to the ends of said rod, said mass including a pair of opposed, generally U-shaped elements secured to the ends of said rod and having their legs on opposite sides of said bar, the center lines of said legs and the axis of said rod lying in a plane perpendicular to the axis of said bar; respective elongated pole pieces of equal length centrally located between and secured to the opposed legs of said U-shaped elements, said pole pieces having opposed end portions equally spaced from said bar; and two pairs of opposed substantially U-shaped permanent magnets parallel to said U-shaped elements, the magnets of each pair extending between said end portions of said pole pieces and being secured thereto, each of the magnets having a north pole engaging one pole piece and a south pole engaging the other pole piece so that both end portions of said one pole piece are north poles and both end portions of said other pole piece are south poles.

7. Sensing apparatus as defined in claim 6, wherein the indicating means comprises a pair of inductive elements surrounding said bar and supported thereon on opposite sides of said U-shaped elements; a transformer device having an excitation coil midway between a pair of output coils on a common axis; a magnetic plug element supported on said common axis by said mass and normally centrally located with respect to said excitation coil; means to supply an excitation voltage to said excitation coil; a push-pull amplifier coupled to said output coils for developing output currents that differ in magnitude and phase in accordance with the direction of movement and position of said plug element relative to its normal position; means coupling said inductive elements to said amplifier so that currents are caused to flow in said inductive elements in direction to oppose any tendency of the magnetic fields from said permanent magnets to attract said bar from its normal position; and means coupled to said amplifier to utilize the output thereof.

8. Sensing apparatus as defined in claim 5, including a pair of inductive elements surrounding said bar and equidistant from the center of said bar; and means responsive to said electric signals to direct currents through said inductive elements to establish a magnetic field through said bar of sufficient magnitude to return said bar to its normal position relative to said poles.

References Cited in the file of this patent

UNITED STATES PATENTS

| | | |
|---|---|---|
| 1,746,420 | Fung | Feb. 11, 1930 |
| 2,370,000 | Best | Feb. 20, 1945 |
| 2,390,187 | Sharpe | Dec. 4, 1945 |
| 2,405,382 | Volet | Aug. 6, 1946 |
| 2,656,519 | Sheppard | Oct. 20, 1953 |
| 2,681,566 | Ruge | June 22, 1954 |
| 2,752,791 | Jarosh et al. | July 3, 1956 |
| 2,869,851 | Sedgfield et al. | Jan. 20, 1959 |
| 2,942,476 | Turner | June 28, 1960 |